Sept. 8, 1936.  W. G. MARSH  2,053,954
FISH LURE
Filed April 5, 1935
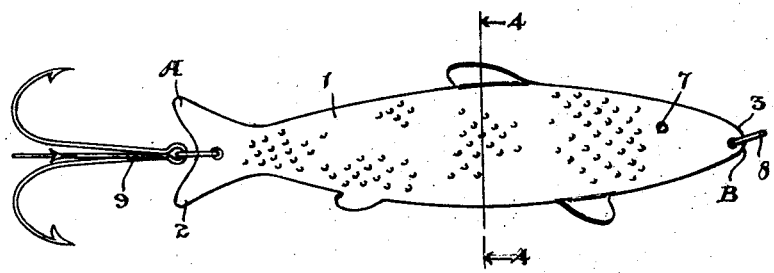
Fig. 1.
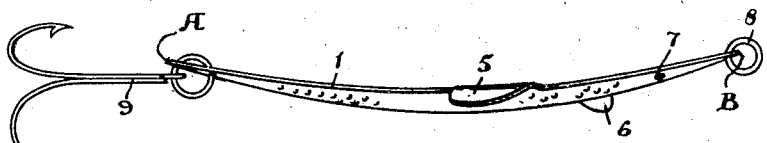
Fig. 2.
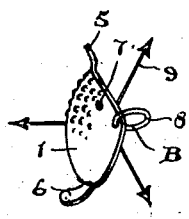 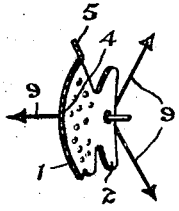
Fig. 3.  Fig. 4.
Inventor:
WILLIAM G. MARSH, DECEASED,
By MARION I. MARSH, EXECUTRIX
by A. J. Dunnison
Atty Patented Sept. 8, 1936

2,053,954

UNITED STATES PATENT OFFICE 2,053,954

FISH LURE

William Gordon Marsh, deceased, late of Toronto, Ontario, Canada, by Marion I. Marsh, executrix, Toronto, Ontario, Canada Application April 5, 1935, Serial No. 14,830
In Canada September 6, 1934

1 Claim. (Cl. 43—42)

The principal objects of this invention are to provide a lure, which will maintain the natural appearance of a small fish under water, and in trolling or casting will, while moving, maintain a natural swimming position and thus be most attractive to the fish which it is desired to catch.

A further object is to devise an attractive lure which will withstand a great deal of punishing and may be manufactured at extremely low cost.

The principal features of the invention consist in the novel shaping of a sheet of metal in the form of the outline of a fish, which is curved transversely and also longitudinally, which causes the lure when pulled by the line to travel through the water with a right and left darting movement, the lure being retained from spinning by a top fin or fluke bent slightly outward in the direction of the convex curvature, and a bottom fluke extending laterally and with a downward and forward slope which maintains a constant downward thrust of the lure against the pulling line.

In the accompanying drawing, Figure 1 is a side elevational view of the lure constructed in accordance with this invention.

Figure 2 is a top edge view of the lure shown in Figure 1.

Figure 3 is an end view taken from the front of the lure shown in Figure 1.

Figure 4 is the vertical sectional view through the line 4—4 of Figure 1.

Many different forms of fish lures constructed of thin material and shaped in concavo-convex form have been devised, but the present invention has achieved a very desirable accomplishment, in that it is devised to "swim" without spinning.

In the form of lure herein shown a length of thin sheet metal is died out in the form of a fish as indicated by the numeral 1, and this sheet metal member is formed with a slight longitudinal curvature extending from the tip of the tail A to the tip of the nose B.

The body of the fish is also curved transversely having the dish shape 4 on the concaved longitudinal curve.

A fin or fluke 5 projects upwardly from the back of the fish-shaped plate about centrally of the length of the back. This fin is bent outwardly in the direction of the convex transverse curve and has the effect of steadying the lure and holding it horizontally in the water.

A fluke 6 arranged about midway between the nose end and the fluke 5 extends downwardly and laterally outward from the bottom edge of the lure, and this fluke is arranged with a downwardly sloping forward edge which, when the lure is being drawn through the water, has the tendency to pull downwardly, thus keeping the lure travelling in a substantially horizontal position and preventing it from riding up with a slight upward pull which necessarily follows the line.

A perforation 7 is cut through the forward end of the lure to represent an eye; and a ring 8 is inserted through a hole in the nose end, while the hook 9 is supported by a ring inserted through a hole inserted in the tail end.

The body of the fish is preferably marked with slight indentations 10 which give a more realistic appearance, somewhat in the form of scales.

Lures such as described may be made in many sizes and with a variation in outline but the principal features of longitudinal and transverse concavity together with the steadying fins as described, must be retained.

What is claimed is:—

A fish lure comprising a sheet metal stamping representing the outline of a fish having a fin midway of the length of its back bent outwardly to one side, the body of the fish being convexed on the side to which said fin is bent, and a fin bent outwardly to the same side as the aforesaid fin from the bottom edge of the fish at a point disposed close to the forward or head end of the lure and in substantially right angular relation to the aforesaid fin and being sloped forwardly and downwardly to create a downward pull at the head end of the lure to counteract the upward line pull thereon.

MARION I. MARSH,
Executrix of the Estate of William G. Marsh, Deceased.